United States Patent
Hung et al.

(10) Patent No.: US 11,131,768 B2
(45) Date of Patent: Sep. 28, 2021

(54) METHOD AND APPARATUS FOR AUTOMOTIVE PARKING ASSISTANCE USING RADAR SENSORS

(71) Applicant: MediaTek Inc., Hsinchu (TW)

(72) Inventors: Chih-Ming Hung, McKinney, TX (US); ChiaYu Lin, Kaohsiung (TW)

(73) Assignee: MediaTek Inc.

( * ) Notice: Subject to any disclaimer, the term of this patent is extended or adjusted under 35 U.S.C. 154(b) by 327 days.

(21) Appl. No.: 15/712,313

(22) Filed: Sep. 22, 2017

(65) Prior Publication Data

US 2018/0088230 A1 Mar. 29, 2018

Related U.S. Application Data

(60) Provisional application No. 62/398,557, filed on Sep. 23, 2016.

(51) Int. Cl.
*G01S 13/931* (2020.01)
*G01S 13/87* (2006.01)
(Continued)

(52) U.S. Cl.
CPC .......... *G01S 13/931* (2013.01); *G01S 13/08* (2013.01); *G01S 13/46* (2013.01); *G01S 13/58* (2013.01); *G01S 13/726* (2013.01); *G01S 13/878* (2013.01); *G01S 7/023* (2013.01); *G01S 2013/468* (2013.01); *G01S 2013/9314* (2013.01); *G01S 2013/93272* (2020.01)

(58) Field of Classification Search
CPC ...... G01S 13/931; G01S 13/46; G01S 13/878; G01S 2013/468
See application file for complete search history.

(56) References Cited

U.S. PATENT DOCUMENTS 5,949,366 A * 9/1999 Herrmann ............... G01S 13/34
342/72
6,166,995 A * 12/2000 Hoenes ................... G01S 15/42
367/99
(Continued)

FOREIGN PATENT DOCUMENTS

CN 101019040 A 8/2007
CN 105247385 A 1/2016
(Continued)

OTHER PUBLICATIONS

Taiwan Intellectual Property Office, Office Action for Taiwan Patent Application No. 107114202, dated Jul. 24, 2019.
(Continued)

*Primary Examiner* — Peter M Bythrow
(74) *Attorney, Agent, or Firm* — Han IP PLLC; Andy M. Han

(57) ABSTRACT

Methods and apparatuses pertaining to automotive parking assistance using radar sensors are described. A processor controls a plurality of radar sensors to transmit radio frequency (RF) signals and receive reflected signals reflected by an object such that each of the radar sensors individually transmits a respective RF signal and receive a respective reflected signal reflected by the object. The processor or the radar sensor detects one or more aspects of the object based on the respective reflected signals received by the plurality of radar sensors.

15 Claims, 5 Drawing Sheets

(51) Int. Cl.
*G01S 13/46* (2006.01)
*G01S 13/72* (2006.01)
*G01S 13/08* (2006.01)
*G01S 13/58* (2006.01)
*G01S 7/02* (2006.01)

(56) References Cited

U.S. PATENT DOCUMENTS

| | | | | |
|---|---|---|---|---|
| 6,727,844 | B1* | 4/2004 | Zimmermann | G01C 3/08 342/70 |
| 6,975,265 | B2* | 12/2005 | Schlick | G01S 7/4004 342/165 |
| 7,176,789 | B2* | 2/2007 | Herder | G01S 15/931 340/435 |
| 7,786,849 | B2* | 8/2010 | Buckley | G01S 13/931 340/431 |
| 8,073,594 | B2* | 12/2011 | Lee | G01S 15/931 701/41 |
| 8,310,376 | B2* | 11/2012 | Frank | G01S 15/931 340/932.2 |
| 2004/0189514 | A1 | 9/2004 | Schlick | G01S 7/4004 342/165 |
| 2005/0068197 | A1* | 3/2005 | Regan | G08G 1/168 340/932.2 |
| 2006/0022866 | A1* | 2/2006 | Walton | H01Q 9/0407 342/194 |
| 2006/0197701 | A1* | 9/2006 | Heide | G01S 7/032 342/118 |
| 2007/0152870 | A1* | 7/2007 | Woodington | G01S 13/528 342/70 |
| 2009/0051593 | A1* | 2/2009 | Wiesbeck | G01S 7/2813 342/372 |
| 2009/0212993 | A1* | 8/2009 | Tsunekawa | G01S 13/931 342/71 |
| 2010/0097264 | A1* | 4/2010 | Kawasaki | G01S 7/032 342/70 |
| 2010/0103023 | A1* | 4/2010 | Ogawa | G01S 13/931 342/59 |
| 2010/0169015 | A1* | 7/2010 | Tsunekawa | G08G 1/166 701/300 |
| 2010/0245065 | A1* | 9/2010 | Harada | G01S 7/529 340/435 |
| 2010/0332078 | A1* | 12/2010 | Hering | G01S 15/87 701/36 |
| 2011/0163909 | A1* | 7/2011 | Jeong | H01Q 5/42 342/70 |
| 2011/0234449 | A1* | 9/2011 | Haberland | G01S 13/343 342/70 |
| 2011/0291874 | A1* | 12/2011 | De Mersseman | G01S 13/931 342/70 |
| 2013/0162461 | A1* | 6/2013 | Lucking | G01S 15/931 342/70 |
| 2014/0302869 | A1* | 10/2014 | Rosenbaum | H04W 64/00 455/456.1 |
| 2014/0347211 | A1* | 11/2014 | Schoor | G01S 13/42 342/147 |
| 2014/0368373 | A1* | 12/2014 | Crain | H01Q 1/007 342/5 |
| 2015/0309154 | A1* | 10/2015 | Lohbihler | G01S 13/10 702/158 |
| 2016/0041258 | A1* | 2/2016 | Cashler | G01S 7/521 342/70 |
| 2016/0170021 | A1* | 6/2016 | Rashid | G01S 13/931 342/70 |
| 2016/0320482 | A1* | 11/2016 | Ling | G01S 7/412 |
| 2017/0315231 | A1* | 11/2017 | Wodrich | G01S 13/931 |
| 2018/0074161 | A1* | 3/2018 | Rosenbaum | G01S 5/14 |

FOREIGN PATENT DOCUMENTS

| | | |
|---|---|---|
| CN | 106546977 A | 3/2017 |
| DE | 1333296 A1 | 8/2003 |
| DE | 102013018753 A1 | 6/2014 |
| GB | 2405474 A | 3/2005 |
| WO | WO 2005022193 A1 | 3/2005 |

OTHER PUBLICATIONS

European Patent Office, European Search Report and European Search Opinion for Patent Application No. 1719635.5-1206, dated Feb. 5, 2018.
China National Intellectual Property Administration, Office Action for China Patent Application No. 201810325564.0, dated Mar. 19, 2020.
European Patent Office, Communication regarding European Patent Application No. 17192635.5, dated Apr. 28, 2020.

\* cited by examiner

METHOD AND APPARATUS FOR AUTOMOTIVE PARKING ASSISTANCE USING RADAR SENSORS

CROSS REFERENCE TO RELATED PATENT APPLICATION(S)

The present disclosure is part of a non-provisional application claiming the priority benefit of U.S. Patent Application No. 62/398,557, filed on 23 Sep. 2016, which is incorporated by reference in its entirety.

TECHNICAL FIELD

The present disclosure is generally related to remote sensing and, more particularly, to automotive parking assistance using radar sensors.

BACKGROUND

Unless otherwise indicated herein, approaches described in this section are not prior art to the claims listed below and are not admitted as prior art by inclusion in this section.

Existing ultrasonic sensor-based parking assistance systems on automobiles (interchangeably referred as "vehicles" herein) tend to have a number of limitations or impairments. For instance, ultrasonic sensors tend to be susceptible to environment effects, have limited detection range or distance, and usually require a relatively longer time to acquire one measurement data. Moreover, ultrasonic sensors tend to be associated with higher cost, and the installation thereof on a vehicle typically requires drilling holes on the bumper of the vehicle. Furthermore, tight timing control is usually required for an ultrasonic sensor-based parking assistance system among the sensors.

On the other hand, typical radar sensors not utilized in parking assistance systems usually have built-in angle of arrival (AoA) detection and at least some level of tracking capability with a high system cost (as multiple transmitters and receivers are needed). Therefore, up to the present-day radar sensors have not been able to fulfill certain requirements to be utilized in parking assistance systems, such as very wide effective field of view (FoV) near a vehicle, elevation, and the like in an economic scale.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions, schemes, concepts, methods and apparatus using radar sensors in parking assistance systems. It is believed that radar sensor-based parking assistance systems do not have aforementioned shortcomings of ultrasonic sensor-based parking assistance systems.

In one aspect, a method may involve a processor controlling a plurality of radar sensors to transmit radio frequency (RF) signals and receive reflected signals reflected by an object such that each of the radar sensors individually transmits a respective RF signal and receive a respective reflected signal reflected by the object. The method may also involve the processor or the radar sensors detecting one or more aspects of the object based on the respective reflected signals received by the plurality of radar sensors.

In one aspect, an apparatus implementable in a vehicle may include a plurality of radar sensors and a processor. The processor may control a plurality of radar sensors to transmit RF signals and receive reflected signals reflected by an object such that each of the radar sensors individually transmits a respective RF signal and receive a respective reflected signal reflected by the object. The processor or the radar sensors may detect one or more aspects of the object based on the respective reflected signals received by the plurality of radar sensors.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Figure 1:
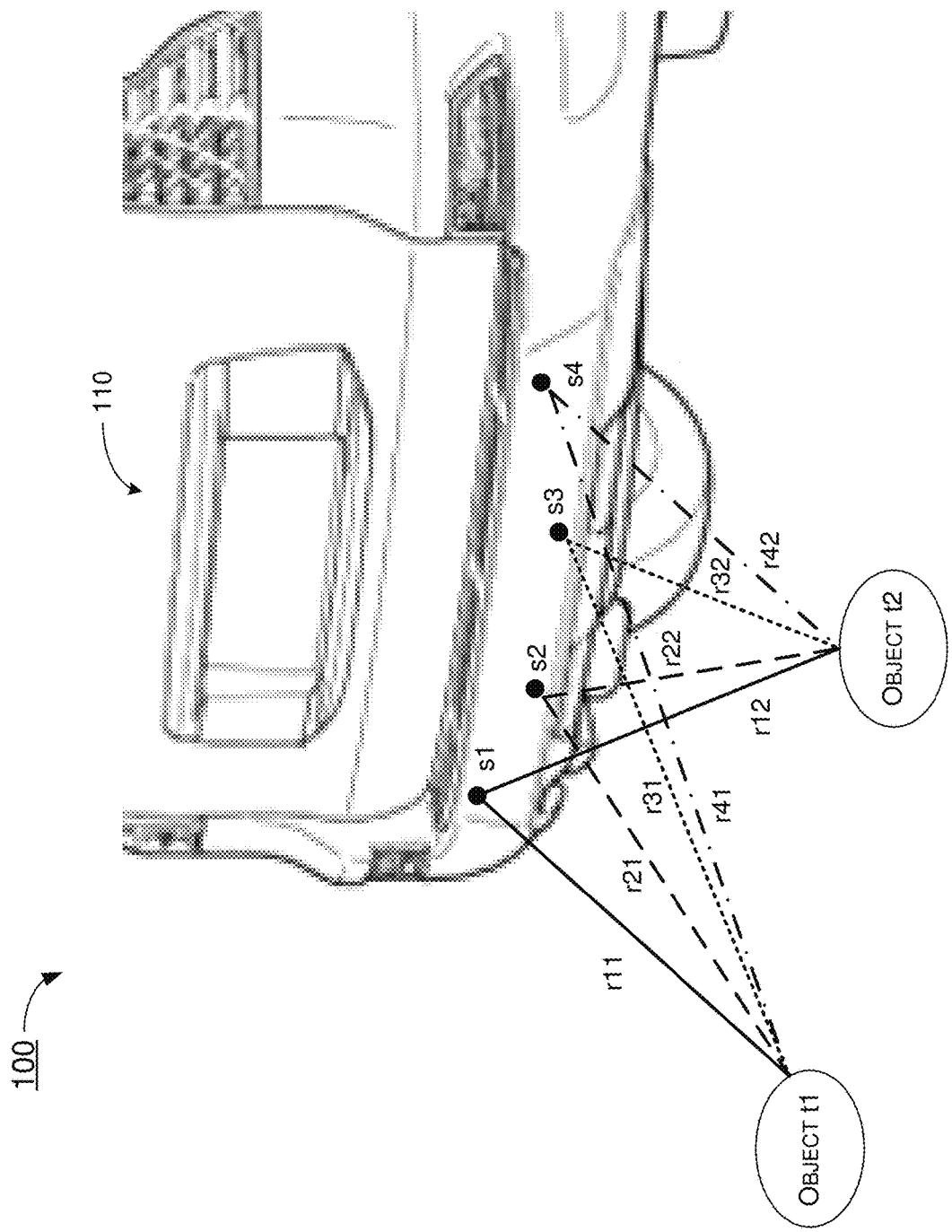
FIG. 1 is a diagram depicting an example scheme in accordance with an implementation of the present disclosure.

FIG. 1 illustrates an example scheme 100 in accordance with an implementation of the present disclosure. In the example shown in FIG. 1, a vehicle 110 (e.g., an autonomous vehicle or a manually-driven vehicle) may be equipped with multiple radar sensors (e.g., radar sensors s1, s2, s3 and s4), which may be millimeter wave (mmWave)

radar sensors for example. Each of radar sensors s1, s2, s3 and s4 may be capable of an object detection range longer than ultrasonic sensors. Each of radar sensors s1, s2, s3 and s4 may include at least one transmitter and at least one receiver. Each of radar sensors s1, s2, s3 and s4 may integrate multiple levels of digital signal processing (DSP) hardware, static random-access memory (SRAM), input/output (I/O), RF antennas to enable timing control, fast object detection, fast object recognition, and scene detection. Each of radar sensors s1, s2, s3 and s4 may independently or otherwise individually report the first K targets near the radar sensor within its FoV, where K is a positive integer greater than or equal to 1.

In scheme 100, a processor communicatively coupled to radar sensors s1, s2, s3 and s4 may use triangulation to estimate exact location of each of one or more objects in the vicinity and within the FoV of radar sensors s1, s2, s3 and s4. Referring to FIG. 1, each of radar sensors s1, s2, s3 and s4 may detect an object t1 and an object t2 in the vicinity of vehicle 110. The detected distance from radar sensor s1 to object t1 and object t2 may be r11 and r12, respectively. The detected distance from radar sensor s2 to object t1 and object t2 may be r21 and r22, respectively. The detected distance from radar sensor s3 to object t1 and object t2 may be r31 and r32, respectively. The detected distance from radar sensor s4 to object t1 and object t2 may be r41 and r42, respectively. The processor may, based on the detected distances r11, r12, r21, r22, r31, r32, r41 and r42, to determine or otherwise estimate the location of each of object t1 and object t2 using triangulation. For instance, based on a valid data set of {r11, r21, r31, r41}, the processor may determine or otherwise estimate the location of object t1. Similarly, based on a valid data set of {r12, r22, r32, r42}, the processor may determine or otherwise estimate the location of object t2. On the other hand, an invalid data set of {r11, r21, r32, r42} may not result in detection of the location of either object t1 or object t2 using triangulation.

It is noteworthy that, although a certain number (i.e., four) of radar sensor is shown in FIG. 1, scheme 100 is applicable to implementations in which there are more or fewer radar sensors.

Figure 2:
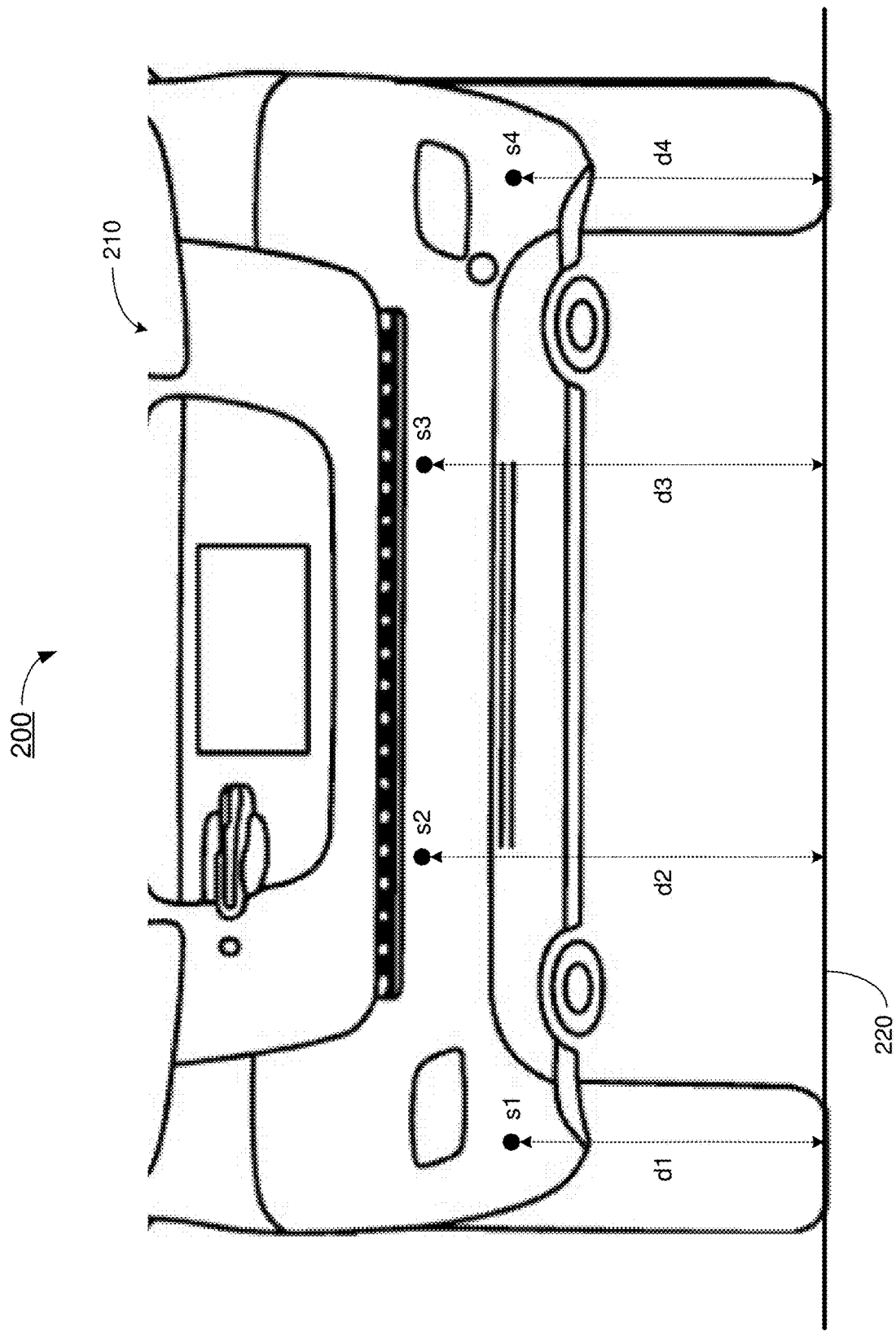
FIG. 2 is a diagram depicting an example scheme in accordance with an implementation of the present disclosure.

FIG. 2 illustrates an example scheme 200 in accordance with an implementation of the present disclosure. In the example shown in FIG. 2, a vehicle 210 (e.g., an autonomous vehicle or a manually-driven vehicle) may be equipped with multiple radar sensors (e.g., radar sensors s1, s2, s3 and s4), which may be mmWave radar sensors for example.

In scheme 200, radar sensors s1, s2, s3 and s4 may be physically arranged in a non-linear array arrangement (e.g., not in or along a straight line). Advantageously, the non-linear array arrangement may enable three-dimensional (3D) measurements without ambiguity. In contrast, ultrasonic sensor-based parking assistance systems are not capable of 3D measurements. In the example shown in FIG. 2, radar sensors s1, s2, s3 and s4 are mounted or otherwise installed on vehicle 210 in a non-linear array arrangement. For instance, the distances d1, d2, d3 and d4 between a reference horizontal line 220 (e.g., the ground) and radar sensors s1, s2, s3 and s4, respectively, may be different. That is, at least one of the distances d1, d2, d3 and d4 may be different from at least another one of the distances d1, d2, d3 and d4.

It is noteworthy that, although a certain number (i.e., four) of radar sensor is shown in FIG. 2, scheme 200 is applicable to implementations in which there are more or fewer radar sensors.

Figure 3:
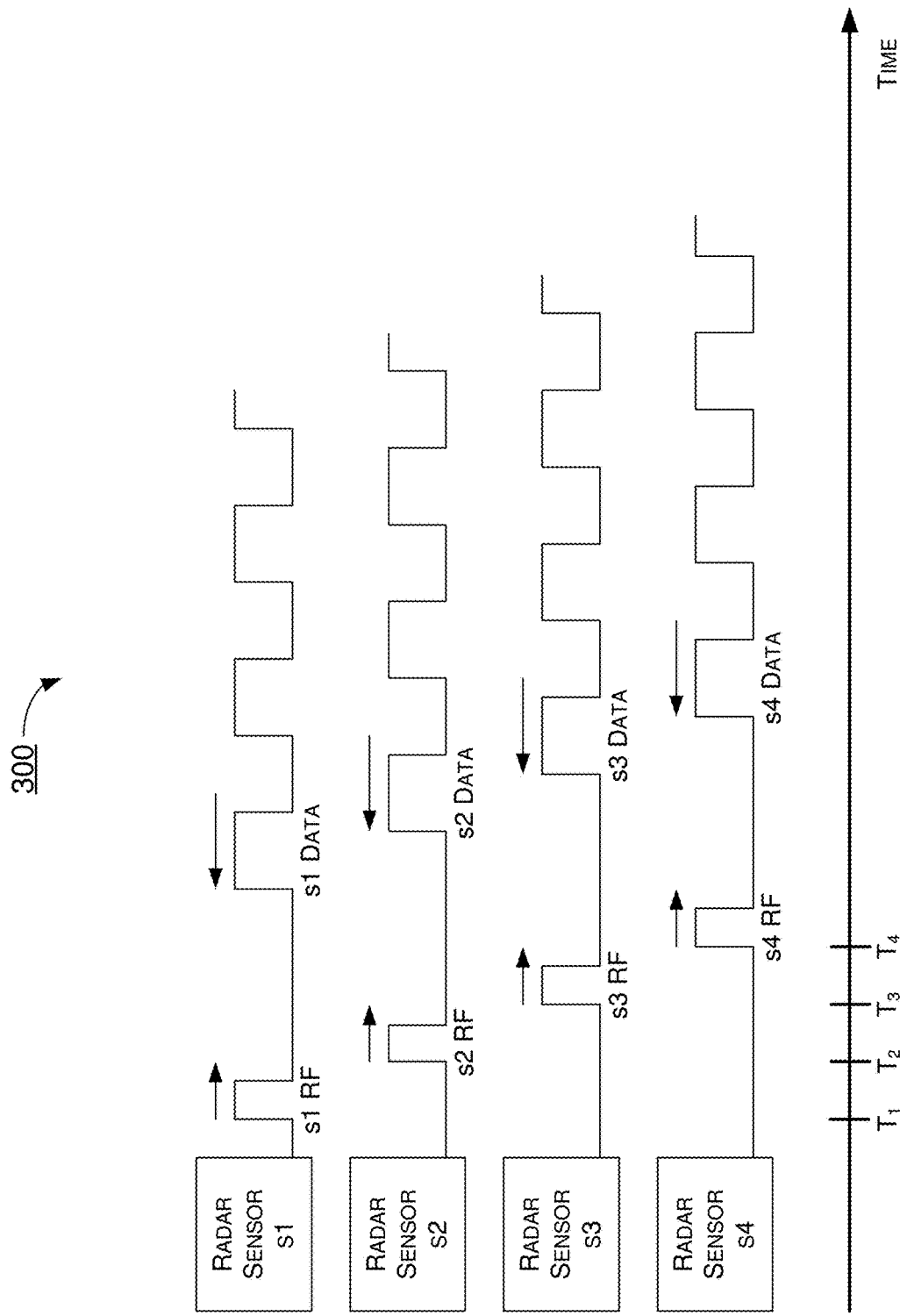
FIG. 3 is a diagram depicting an example scheme in accordance with an implementation of the present disclosure.

FIG. 3 illustrates an example scheme 300 in accordance with an implementation of the present disclosure. In scheme 300, a number of radar sensors (e.g., radar sensors s1, s2, s3 and s4) in accordance with the present disclosure may be controlled to transmit RF radar signals (e.g., s1 RF, s2 RF, s3 RF and s4 RF, respectively) in a concerted fashion (e.g., sequentially one at a time) such that the radar sensors do not interfere with each other.

Referring to FIG. 3, radar sensor s1 may transmit radar signal s1 RF at time $T_1$, radar sensor s2 may transmit radar signal s2 RF at time $T_2$, radar sensor s3 may transmit radar signal s3 RF at time $T_3$, and radar sensor s4 may transmit radar signal s4 RF at time $T_4$. Correspondingly, radar sensor s1 may receive a reflected signal s1 data, radar sensor s2 may receive a reflected signal s2 data, radar sensor s3 may receive a reflected signal s3 data, and radar sensor s4 may receive a reflected signal s4 data.

Compared to a typical ultrasonic sensor-based parking assistance system, in which the signal propagates at the speed of sound (which is slow), the signals of radar sensor-based parking assistance systems in accordance with the present disclosure propagate at the speed of light. Accordingly, each measurement may have significantly less time than would be with a typical ultrasonic sensor-based parking assistance system.

It is noteworthy that, although a certain number (i.e., four) of radar sensor is shown in FIG. 3, scheme 300 is applicable to implementations in which there are more or fewer radar sensors.

Illustrative Implementations

Figure 4:
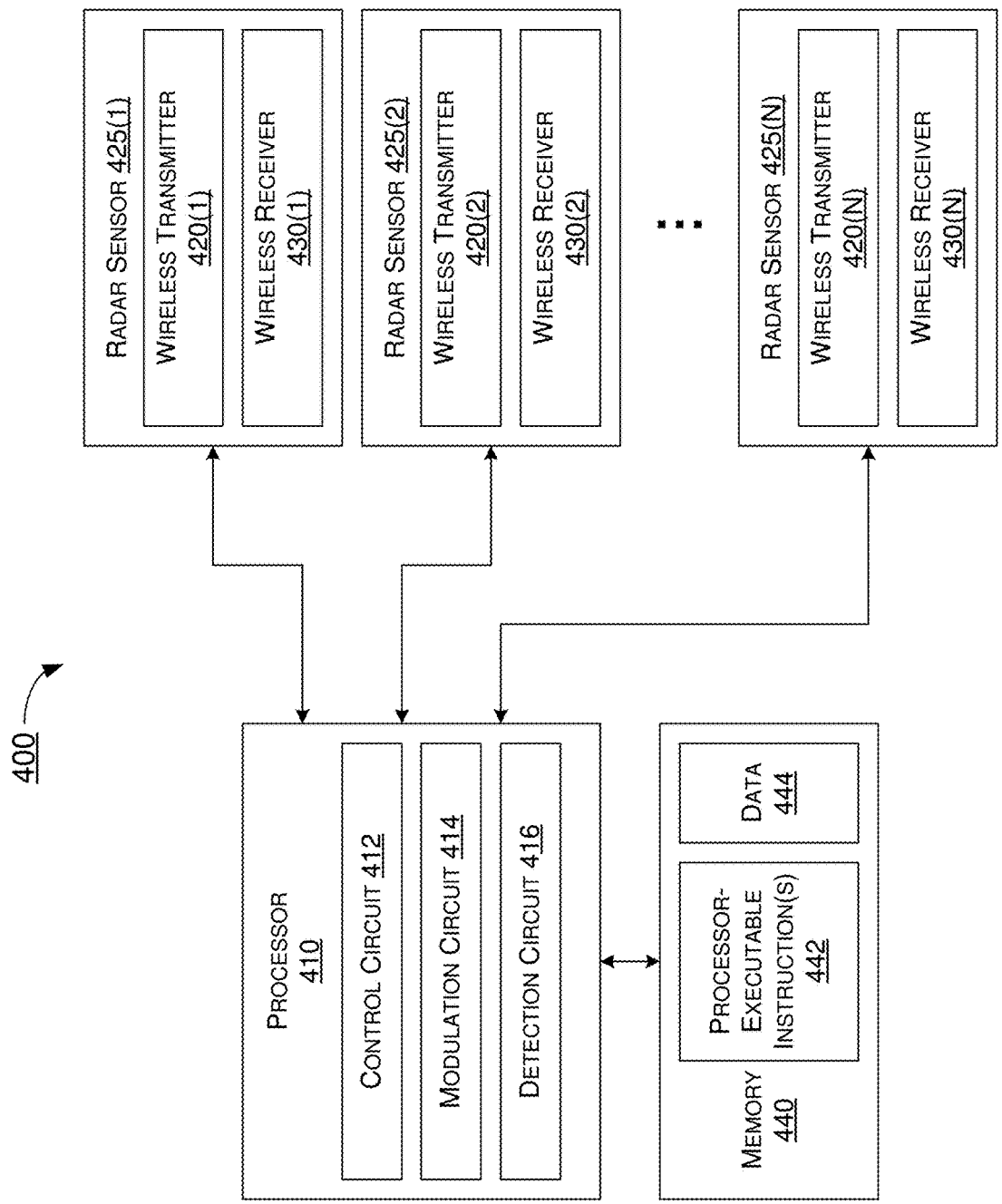
FIG. 4 is a block diagram of an example apparatus in accordance with an implementation of the present disclosure.

FIG. 4 illustrates an example apparatus 400 in accordance with an implementation of the present disclosure. Apparatus 400 may perform various functions to implement schemes, techniques, processes and methods described herein pertaining to automotive parking assistance using radar sensors, including schemes 100, 200 and 300 described above as well as process 500 described below. Apparatus 400 may be a part of an electronic apparatus, which may be an electronic control unit (ECU) of a vehicle. Alternatively, apparatus 400 may be a part of a portable or mobile apparatus, a wearable apparatus, a wireless communication apparatus or a computing apparatus. In some implementations, apparatus 400 may be in the form of one or more integrated-circuit (IC) chips such as, for example and without limitation, one or more single-core processors, one or more multi-core processors, or one or more complex-instruction-set-computing (CISC) processors. Apparatus 400 may include one or more of the components shown in FIG. 4. In some implementations, apparatus 400 may include a processor 410 and without the capability of a radar sensor. Alternatively, apparatus 400 may be implemented as one or more radar sensors such as one or more of a plurality of radar sensors 425(1)~425(N), without processor 410. Apparatus 400 may also include one or more other components not pertinent to the proposed schemes of the present disclosure (e.g., internal power supply, display device and/or user interface device), and, thus, such other component(s) of apparatus 400 is/are neither shown in FIG. 4 nor described below in the interest of simplicity and brevity.

In one aspect, processor 410 may be implemented in the form of one or more single-core processors, one or more multi-core processors, or one or more CISC processors. That is, even though a singular term "a processor" is used herein to refer to processor 410, processor 410 may include multiple processors in some implementations and a single processor in other implementations in accordance with the present disclosure. In another aspect, processor 410 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 410 is a special-purpose machine specifically designed, arranged and configured to perform specific tasks including automotive parking assistance using radar sensors in accordance with various implementations of the present disclosure.

In some implementations, apparatus 400 may also include multiple radar sensors 425(1)~425(N), where N is a positive integer greater than 1. Each of the radar sensors 425(1)~425(N) may respectively include at least a transmitter and at least a receiver. For instance, radar sensor 425(1) may include a wireless transmitter 420(1) and a wireless receiver 430(1), radar sensor 425(2) may include a wireless transmitter 420(2) and a wireless receiver 430(2), and so on such that radar sensor 425(N) may include a wireless transmitter 420(N) and a wireless receiver 430(N). Each of wireless transmitters 420(1)~420(N) may be configured to wirelessly transmit RF signals as electromagnetic (EM) waves. Each of wireless receivers 430(1)~430(N) may be configured to wirelessly receive RF signals as waves. For instance, as part of a respective radar sensor of radar sensors 425(1)~425(N), the wireless transmitter may transmit signals and/or waveforms generated by processor 410, and the wireless receiver may receive one or more reflected waves reflected by an object (e.g., a vehicle, a cyclist, a pedestrian, an infrastructure object or any object potentially encountered by a moving vehicle). In some implementations, each of wireless receivers 430(1)~430(N) may obtain waveform generation information (e.g., from processor 410) for receiver signal processing to perform correlation based on received waveforms (e.g., the one or more reflected waves) received by the wireless receiver and transmitted waveforms obtained from the waveform generation information (e.g., information pertaining to the signals/waveforms transmitted by the corresponding wireless transmitter). In some implementations, radar sensors 425(1)~425(N) may communicate with processor 410 simultaneously via wired interface. In some implementations, the interface between radar sensors 425(1)~425(N) and processor 410 may be in digital format, which is less susceptible to noise.

In some implementations, apparatus 400 may additionally include a memory 440. Memory 440 may be a storage device configured to store one or more sets of processor-executable codes, programs and/or instructions 442 as well as data 444 therein. Data 444 may include, for example, the waveform generation information. For example, memory 440 may be operatively coupled to processor 410 to receive data 444, and processor 410 may access memory 440 to execute the processor-executable instruction(s) 442. Memory 440 may be implemented by any suitable technology and may include volatile memory and/or non-volatile memory. For example, memory 440 may include a type of random-access memory (RAM) such as dynamic RAM (DRAM), static RAM (SRAM), thyristor RAM (T-RAM) and/or zero-capacitor RAM (Z-RAM). Alternatively or additionally, memory 440 may include a type of read-only memory (ROM) such as mask ROM, programmable ROM (PROM), erasable programmable ROM (EPROM) and/or electrically erasable programmable ROM (EEPROM). Alternatively or additionally, memory 440 may include a type of non-volatile random-access memory (NVRAM) such as flash memory, solid-state memory, ferroelectric RAM (FeRAM), magnetoresistive RAM (MRAM) and/or phase-change memory.

In some implementations, processor 410 may include a control circuit 412, a modulation circuit 414 and a detection circuit 416. Control circuit 412 may control operations of each of radar sensors 425(1)~425(N). Modulation circuit 414 may set commands to the radar sensor 425(1)~425(N), and the radar sensor 425(1)~425(N) accordingly generate a plurality of wave frames (for example, by EM wave generators included in the radar sensors) for transmission by wireless transmitters 420(1)~420(N). Detection circuit 416 may receive, from wireless receivers 430(1)~430(N), one or more reflected waves comprising at least a portion of one or more of the wave frames reflected by one or more objects.

In some implementations, control circuit 412 may control wireless transmitters 420(1)~420(N) of radar sensors 425(1)~425(N) to transmit RF signals and control wireless receivers 430(1)~430(N) of radar sensors 425(1)~425(N) to receive reflected signals reflected by one or more objects (e.g., object t1 and/or object t2) such that each of the radar sensors 425(1)~425(N) individually transmits a respective RF signal and receive a respective reflected signal reflected by each of the one or more objects. Moreover, detection circuit 416 may detect one or more aspects of each of the one or more objects based on the respective reflected signals received by wireless receivers 430(1)~430(N) of radar sensors 425(1)~425(N).

In some implementations, in controlling radar sensors 425(1)~425(N) to transmit the RF signals and receive the reflected signals, control circuit 412 may control radar sensors 425(1)~425(N) to sequentially transmit the RF signals one radar sensor at a time. For instance, as shown in scheme 300, the timing of the transmissions is constructed such that radar sensors 425(1)~425(N) do not interfere with each other.

In some implementations, in detecting the one or more aspects of the object, radar sensors 425(1)~425(N) may determine at least one of the one or more aspects of the object (such as distance and velocity) using more than one of the reflected signals received by more than one of the radar sensors, and send determination results to detection circuit 416. Detection circuit 416 may determine angle of arrival (AoA) by triangulation using determination results received from the radar sensors 425(1)~425(N).

In some implementations, in detecting the one or more aspects of the object, radar sensors 425(1)~425(N) may simultaneously detect the one or more aspects of each of a plurality of objects.

In some implementations, in detecting the one or more aspects of the object, detection circuit 416 may detect the one or more aspects of the objects based on reflection strengths of the reflected signals, patterns of echoes of the reflected signals, reflectivity information with respect to the object, or a combination thereof.

In some implementations, in detecting the one or more aspects of the object, detection circuit 416 or radar sensors 425(1)~425(N) may detect a distance, a location, a velocity, a trajectory, or a combination thereof with respect to the object.

In some implementations, in detecting the one or more aspects of the object, detection circuit 416 or radar sensors 425(1)~425(N) may estimate a size of the object based on at least some of the reflected signals.

In some implementations, in detecting the one or more aspects of the object, detection circuit 416 or radar sensors 425(1)~425(N) may estimate a material of the object based on at least some of the reflected signals.

In some implementations, radar sensors 425(1)~425(N) may be physically arranged in a non-linear array, such as that shown in scheme 200 for example.

In some implementations, each radar sensor of radar sensors 425(1)~425(N) may be a mmWave radar sensor.

In some implementations, apparatus 400 may be able to combine blind spot detection (BSD), cross traffic alert (CTA), detection of object ahead (DOA), active parking assistance (APA) and/or moving object detection (MOD) functions into radar sensor-based parking assistance systems by appropriate radar sensor installation. For instance, apparatus 400 may be designed (e.g., with two-dimensional (2D) Fast Fourier Transform (FFT)) to support speed reporting for applications such as CTA, DOA, BSD and the like. Moreover, corresponding antennas may be designed to cover wide FoV to support various functions such as those listed above. Additionally, algorithms executed or otherwise implemented in processor 410 may be designed to support detection of very long distance as well as clutter filtering for various functions such as those listed above.

Thus, when implemented in or as a radar sensor-based parking assistance system, apparatus 400 may offer a number of advantages over ultra sensor-based parking assistance systems. For instance, apparatus 400 may be capable of determining and reporting the velocity of each detected object, while a typical ultra sensor-based parking assistance system does not have such capability. Additionally, apparatus 400 may be able to report multi-object information simultaneously, while a typical ultra sensor-based parking assistance system may be partially constrained when objects are in a line in front of the ultrasonic sensor. Moreover, apparatus 400 may have a higher interference tolerance than that of a typical ultra sensor-based parking assistance system. For example, a radar sensor typically has "air" time that is a thousand times shorter than that of an ultrasonic sensor, and radar sensors typically have more flexibility for waveforms in the air.

Apparatus 400 may be capable of ground detection for suspension optimization, for example, based on reflection strength and patterns of the echoes over frequency and distance, as well as reflectivity information based on properties of the material of the detected object. Furthermore, apparatus 400 may be able to determine or otherwise estimate object size and, potentially, the material of the object (e.g., to determine whether the object is a pedestrian or another vehicle). Compared to a typical ultra sensor-based parking assistance system, apparatus 400 may have faster data acquisition to enable more ECU intelligence. For example, there may be more time for signal and data processing as a result of faster data acquisition, and there may be more measurements within a given amount of time to render a critical decision (e.g., how to maneuver the vehicle to avoid a hazardous situation). Moreover, as each of radar sensors 425(1)~425(N) may have one transmitter and one receiver, the overall size may be small enough to have antennas in a package to allow very small form factor and very low cost of manufacturing. Additionally, if necessary more transmitters and receivers may be added by, for example, having multiple ICs and/or modules.

Figure 5:
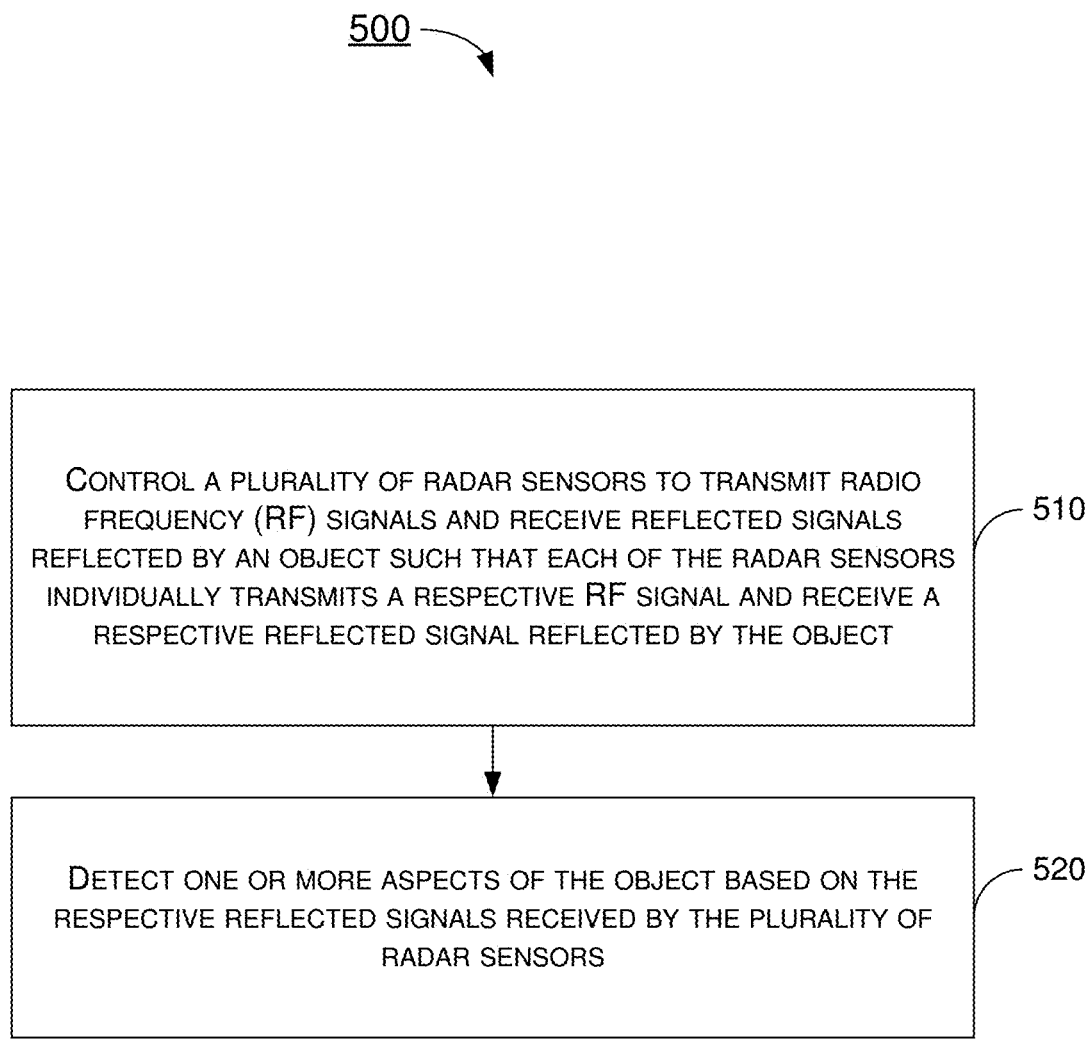
FIG. 5 is a flowchart of an example process in accordance with an implementation of the present disclosure.

FIG. 5 illustrates an example process 500 in accordance with an implementation of the present disclosure. Process 500 may be an example implementation of one, some or all of schemes 100, 200 and 400, whether partially or completely, with respect to automotive parking assistance using radar sensors in accordance with the present disclosure. Process 500 may represent an aspect of implementation of features of apparatus 400. Process 500 may include one or more operations, actions, or functions as illustrated by one or more of blocks 510 and 520. Although illustrated as discrete blocks, various blocks of process 500 may be divided into additional blocks, combined into fewer blocks, or eliminated, depending on the desired implementation. Additionally, process 500 may be executed or otherwise carried out in repetition. Moreover, the blocks of process 500 may executed in the order shown in FIG. 5 or, alternatively, in a different order. Process 500 may be implemented by apparatus 400 and any modifications and/or derivatives thereof. Solely for illustrative purposes and without limitation, process 500 is described below with reference to apparatus 400. Process 500 may begin at block 510.

At 510, process 500 may involve processor 410 of apparatus 400 controlling a plurality of radar sensors 425(1)~425(N) to transmit RF signals and receive reflected signals reflected by an object (e.g., object t1 and/or object t2) such that each of the radar sensors 425(1)~425(N) individually transmits a respective RF signal and receive a respective reflected signal reflected by the object. Process 500 may proceed from 510 to 520.

At 520, process 500 may involve processor 410 or one or more of radar sensors 425(1)~425(N) detecting one or more aspects of the object based on the respective reflected signals received by the plurality of radar sensors 425(1)~425(N).

In some implementations, in controlling the plurality of radar sensors 425(1)~425(N) to transmit the RF signals and receive the reflected signals, process 500 may involve processor 410 controlling the plurality of radar sensors 425(1)~425(N) to sequentially transmit the RF signals one radar sensor at a time.

In some implementations, in detecting the one or more aspects of the object, process 500 may involve processor 410 or radar sensors 425(1)~425(N) determining at least one of the one or more aspects of the object by triangulation using more than one of the reflected signals received by more than one of the radar sensors 425(1)~425(N).

In some implementations, in detecting the one or more aspects of the object, process 500 may involve processor 410 or radar sensors 425(1)~425(N) simultaneously detecting the one or more aspects of each of a plurality of objects.

In some implementations, in detecting the one or more aspects of the object, process 500 may involve processor 410 or radar sensors 425(1)~425(N) detecting the one or more aspects of the objects based on reflection strengths of the reflected signals, patterns of echoes of the reflected signals, reflectivity information with respect to the object, or a combination thereof.

In some implementations, in detecting the one or more aspects of the object, process 500 may involve processor 410 or radar sensors 425(1)~425(N) detecting a distance, a location, a velocity, a trajectory, or a combination thereof with respect to the object.

In some implementations, in detecting the one or more aspects of the object, process 500 may involve processor 410 or radar sensors 425(1)~425(N) estimating a size of the object based on at least some of the reflected signals.

In some implementations, in detecting the one or more aspects of the object, process 500 may involve processor 410 or radar sensors 425(1)~425(N) estimating a material of the object based on at least some of the reflected signals.

In some implementations, the plurality of radar sensors 425(1)~425(N) may be physically arranged in a non-linear array.

In some implementations, each radar sensor of the plurality of radar sensors 425(1)~425(N) may include at least a transmitter and a receiver.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:

controlling, by a processor when in operation, a plurality of radar sensors configured to be installed on a vehicle to:

transmit radio frequency (RF) signals one radar sensor at a time sequentially with no more than one radar sensor transmitting at any given time to prevent the radar sensors from interfering with each other, and receive reflected signals reflected by an object such that each of the radar sensors individually transmits a respective RF signal and receive a respective reflected signal reflected by the object; and detecting, by the processor or the radar sensors, one or more aspects of the object based on the respective reflected signals received by the plurality of radar sensors, wherein, when installed on the vehicle, the plurality of radar sensors are at two or more different heights relative to a ground on which the vehicle is disposed, and wherein the detecting of the one or more aspects of the object comprises determining at least an angle of arrival (AoA) by triangulation using at least three of the reflected signals received by at least three of the radar sensors.

2. The method of claim 1, wherein the detecting of the one or more aspects of the object comprises simultaneously detecting the one or more aspects of each of a plurality of objects.

3. The method of claim 1, wherein the detecting of the one or more aspects of the object comprises detecting the one or more aspects of the objects based on reflection strengths of the reflected signals, patterns of echoes of the reflected signals, reflectivity information with respect to the object, or a combination thereof.

4. The method of claim 1, wherein the detecting of the one or more aspects of the object comprises detecting a distance, a location, a velocity, a trajectory, or a combination thereof with respect to the object.

5. The method of claim 1, wherein the detecting of the one or more aspects of the object comprises estimating a size of the object based on at least some of the reflected signals.

6. The method of claim 1, wherein the detecting of the one or more aspects of the object comprises estimating a material of the object based on at least some of the reflected signals.

7. The method of claim 1, wherein the plurality of radar sensors are physically arranged in a non-linear array.

8. The method of claim 1, wherein each radar sensor of the plurality of radar sensors comprises at least a transmitter and a receiver.

9. An apparatus implementable in a vehicle, comprising:
a plurality of radar sensors configured to be installed on the vehicle and physically arranged in a non-linear array relative to a horizontal plane such that, when installed on the vehicle, the plurality of radar sensors are at two or more different heights relative to a ground on which the vehicle is disposed; and
a processor coupled to the plurality of radar sensors such that, when in operation, the processor controls the plurality of radar sensors to:
transmit radio frequency (RF) signals one radar sensor at a time sequentially with no more than one radar sensor transmitting at any given time to prevent the radar sensors from interfering with each other, and
receive reflected signals reflected by an object such that each of the radar sensors individually transmits a respective RF signal and receive a respective reflected signal reflected by the object,
wherein one or more aspects of the object are detected based on the respective reflected signals received by the plurality of radar sensors, and
wherein, in detecting the one or more aspects of the object, the processor determines at least an angle of arrival (AoA) by triangulation using at least three of the reflected signals received by at least three of the radar sensors.

10. The apparatus of claim 9, wherein, in detecting the one or more aspects of the object, the processor or the radar sensors simultaneously detects the one or more aspects of each of a plurality of objects.

11. The apparatus of claim 9, wherein, in detecting the one or more aspects of the object, the processor or the radar sensors detects the one or more aspects of the objects based on reflection strengths of the reflected signals, patterns of echoes of the reflected signals, reflectivity information with respect to the object, or a combination thereof.

12. The apparatus of claim 9, wherein, in detecting the one or more aspects of the object, the processor or the radar sensors detects a distance, a location, a velocity, a trajectory, or a combination thereof with respect to the object.

13. The apparatus of claim 9, wherein, in detecting the one or more aspects of the object, the processor or the radar sensors estimates a size of the object based on at least some of the reflected signals.

14. The apparatus of claim 9, wherein, in detecting the one or more aspects of the object, the processor or the radar sensors estimates a material of the object based on at least some of the reflected signals.

15. The apparatus of claim 9, wherein each radar sensor of the plurality of radar sensors comprises at least a transmitter and a receiver.

* * * * *